(12) United States Patent
Frank et al.

(10) Patent No.: US 9,793,776 B2
(45) Date of Patent: Oct. 17, 2017

(54) DRIVE MECHANISM FOR ROTATABLY COUPLING A SYSTEM PART OR A MACHINE PART

(71) Applicant: IMO Holding GmbH, Gremsdorf (DE)

(72) Inventors: Hubertus Frank, Höchstadt (DE); Volker Dietz, Höchstadt a.d. Aisch (DE)

(73) Assignee: IMO Holding GmbH, Gremsdorf (DE)

( * ) Notice: Subject to any disclaimer, the term of this patent is extended or adjusted under 35 U.S.C. 154(b) by 303 days.

(21) Appl. No.: 14/758,691

(22) PCT Filed: Aug. 7, 2013

(86) PCT No.: PCT/DE2013/000448
§ 371 (c)(1),
(2) Date: Jun. 30, 2015

(87) PCT Pub. No.: WO2014/101910
PCT Pub. Date: Jul. 3, 2014

(65) Prior Publication Data
US 2015/0364968 A1 Dec. 17, 2015

(30) Foreign Application Priority Data

Dec. 31, 2012 (DE) .................. 10 2012 025 600

(51) Int. Cl.
*H02K 7/08* (2006.01)
*H01F 38/18* (2006.01)
(Continued)

(52) U.S. Cl.
CPC ............ *H02K 7/088* (2013.01); *B66C 23/84* (2013.01); *E02F 9/123* (2013.01); *F16C 19/381* (2013.01);
(Continued)

(58) Field of Classification Search
CPC ........ H01F 38/18; E02F 9/123; F16C 41/004; F16C 41/001; F16C 19/381;
(Continued)

(56) References Cited

U.S. PATENT DOCUMENTS 4,582,436 A * 4/1986 Merron .................. E02F 9/121
384/593
4,622,860 A * 11/1986 Cametti .................. E02F 9/121
212/175

(Continued)

FOREIGN PATENT DOCUMENTS

DE 221987 5/1985
EP 0245590 11/1987
(Continued)

*Primary Examiner* — Mohamad Musleh
(74) *Attorney, Agent, or Firm* — Pandiscio & Pandiscio (57) ABSTRACT

The invention relates to a drive mechanism (1) for rotatably coupling a first system part or machine part, preferably an assembly (A), to a base, pedestal or frame or to another system part or machine part, for example for rotary positioning during the processing of large workpieces or during the moving of loads, which drive mechanism comprises two ring-shaped connecting elements (3, 4) each having at least one planar connecting surface (5, 6) and fastening means (7, 8) that are arranged distributed in a crown shape therein and effect connection to different system parts or machine parts or the like, said two connecting elements (3, 4) being arranged concentrically with each other and radially one inside the other with a gap-shaped interspace (9) in which are disposed one or more rows of rolling elements (14, 15, 16), each row whereof rolls between two respective raceways (17, 18) on the two connecting elements (3, 4), thus enabling same to rotate relative to each other, at least one connecting surface (5, 6) and at least one raceway (17, 18) being formed by machining or shaping a common base body. The invention is characterized in that at least one fully (Continued)

circumferentially extending row of magnets (40) is arranged inside the gap (9) on one connecting element (3, 4) and at least one fully circumferentially extending row of coils (38) is arranged directly opposite said magnets on the other connecting element (4, 3). According to the invention, at least one fully circumferentially extending row of magnets is arranged inside the gap on one connecting element and at least one fully circumferentially extending row of coils is arranged directly opposite said magnets on the other connecting element.

24 Claims, 8 Drawing Sheets

(51) Int. Cl.
<table>
<tr><td>B66C 23/84</td><td>(2006.01)</td></tr>
<tr><td>E02F 9/12</td><td>(2006.01)</td></tr>
<tr><td>F16C 41/00</td><td>(2006.01)</td></tr>
<tr><td>H02K 21/22</td><td>(2006.01)</td></tr>
<tr><td>H02K 7/102</td><td>(2006.01)</td></tr>
<tr><td>H02K 7/14</td><td>(2006.01)</td></tr>
<tr><td>F16C 19/38</td><td>(2006.01)</td></tr>
<tr><td>H02K 11/21</td><td>(2016.01)</td></tr>
</table>

(52) U.S. Cl.
CPC .......... *F16C 41/001* (2013.01); *F16C 41/004* (2013.01); *H01F 38/18* (2013.01); *H02K 7/102* (2013.01); *H02K 7/14* (2013.01); *H02K 11/21* (2016.01); *H02K 21/22* (2013.01); *F16C 2300/02* (2013.01); *F16C 2300/14* (2013.01); *F16C 2322/39* (2013.01); *F16C 2350/26* (2013.01)

(58) Field of Classification Search
CPC .............. F16C 2350/26; F16C 2300/14; F16C 2300/02; F16C 2322/39; H02K 21/22; H02K 7/102; H02K 7/14; H02K 7/088; H02K 11/21; B66C 23/84
See application file for complete search history.

(56) References Cited

U.S. PATENT DOCUMENTS 9,506,219 B2 * 11/2016 Bienfang .................. E02F 3/46
2011/0255815 A1 * 10/2011 Frank .................... F16C 19/163
384/462

FOREIGN PATENT DOCUMENTS

<table>
<tr><td>EP</td><td>0402240</td><td>12/1990</td></tr>
<tr><td>EP</td><td>1593865</td><td>11/2005</td></tr>
<tr><td>EP</td><td>1953898</td><td>8/2008</td></tr>
<tr><td>EP</td><td>2348612</td><td>7/2011</td></tr>
<tr><td>JP</td><td>2006-34024</td><td>2/2006</td></tr>
</table>

* cited by examiner

DRIVE MECHANISM FOR ROTATABLY COUPLING A SYSTEM PART OR A MACHINE PART

REFERENCE TO PENDING PRIOR PATENT APPLICATIONS

This patent application claims benefit of International (PCT) Patent Application No. PCT/DE2013/000448, filed 7 Aug. 2013 by IMO Holding GmbH for DRIVE MECHANISM FOR ROTATABLY COUPLING A SYSTEM PART OR A MACHINE PART, which claims benefit of German Patent Application No. DE 10 2012 025 600.0, filed 31 Dec. 2012, which patent applications are hereby incorporated herein by reference.

FIELD OF THE INVENTION

The invention relates to a drive mechanism for rotatably coupling a system part or a machine part to a base, pedestal or frame or to another system part or machine part, preferably for rotatably coupling two relatively rotatable parts of a heavy-duty vehicle or even a construction machine, alternatively for the rotary positioning of large workpieces, which drive mechanism comprises two ring-shaped connecting elements each having at least one planar connecting surface and fastening means arranged distributed in a crown shape for connection to different system parts or machine parts or the like, said two connecting elements being arranged concentrically with each other and radially one inside the other with a gap-shaped interspace in which are disposed one or more rows of rolling elements, each row whereof rolls between a respective two raceways on the two connecting elements such that the latter can be rotated relative to each other, at least one connecting surface and at least one raceway being formed by machining or shaping a common base body.

THE PRIOR ART AND ITS DISADVANTAGES

Background of the Invention

The devices normally used to rotatably couple a first system part or machine part to a base, pedestal or frame or to another system part or machine part are open-center large rolling bearings with a gap circumference of more than a meter; the connecting surfaces of the bearings are fastened to planar contact surfaces of the particular system parts or machine parts by a plurality of fastening means arranged distributed in a crown shape. Cables, supply lines or the like can be passed through the opening in the region of the center of such a drive mechanism. By shaping or incorporating a connection surface and at least one raceway in a common base body, it is possible to achieve a degree of precision such that precessional movement can be completely eliminated.

It is frequently necessary not only to rotatably couple two system parts or machine parts to each other or guide them next to each other, but also to influence the rotational behavior itself, i.e., the direction, the speed or even the angle of rotation. Rotationally fixed coupling to a drive motor is necessary for this purpose. To this end, one of the ring-shaped connecting elements is generally provided with a fully circumferential toothing that is engaged by a pinion or a worm gear disposed on the drive shaft of the drive motor. The disadvantage of this arrangement is that positional accuracy is usually limited because of the virtually inescapable play between the circumferential toothing and the pinion or worm gear engaging with it.

In particular, a problem with many of the ships, vehicles or heavy-duty vehicles and/or construction machines in common use today is that although such (heavy-duty) vehicles or (construction) machines are self-propelled or self-moving by virtue of a drive that is carried along with the vehicle or machine, the enormous (heavy-duty) vehicle or construction machine in question needs very high drive power $P_{drive/axle\ r}$ to move any such drive unit, for example of each wheel and/or chain drive.

The same applies to moving the assemblies present on or at this vehicle or heavy-duty vehicle and/or on or at the latter: if such assemblies, for example an antenna tower or a gun carriage or an excavating arm or a lifting arm or boom lift/platform lift or an operator's cab or a telescopic boom or a rotating ladder platform, are designed to be able to rotate or pivot, then a very high drive power $P_{drive/axle\ r}$ is often needed to move such assemblies.

Those of said (heavy-duty) vehicles and/or construction machines that are not operated in bodies of water or on the seas particularly include:
- underground tunneling machines,
- multi-axle drive heavy-duty cranes with a mass of between 80 and 2,000 MT (metric tons),
- special vehicles with a mass of >50 MT,
- undercarriages for slow-moving bucket-wheel excavators and/or port and ship cranes, each with a total mass of between 3,500 and 18,500 MT, or the like,
- lifting and load-conveying machines with a total mass of between 300 and 5,000 MT.

In practice heretofore, this (these) drive unit(s) (wheels and/or chains or the like) for the aforesaid (heavy-duty) vehicles and/or construction machines have been set in motion by powerful internal combustion engines, primarily by the very widely used diesel engines.

Similar considerations apply to many of the aforesaid rotatable or pivotable assemblies, for example to a large rotating crane or an antenna tower or a heavy gun carriage or a bulky excavator arm or a lifting arm or a boom lift/platform lift sized to handle heavy loads, or the like.

This setting in motion of the drive unit(s) and of the rotatable or pivotable assembly(ies) is usually not done directly, but rather by means of a shiftable transmission that is mechanically coupled to the internal combustion engine(s) provided with or on the vehicle. Without such a transmission, in the current state of the art it would, as a rule, be nearly impossible to transmit power from the internal combustion engine to the drive mechanism(s) or the rotatable/pivotable assembly.

Internal combustion engines have the inherent disadvantage that the drive torque that can be applied is a function of engine rotation speed, speeds of approximately n>500 rpm or more always being necessary before the maximum drive torque can be reached. (Note: with the aforesaid electric motors of established design, very high drive torque is reached even in a very low rpm range in the current state of the art.)

Hence, the larger and heavier the (heavy-duty) vehicle and/or the construction machine, the higher the holding torque that must be overcome by the drive torque of the internal combustion engine in order to set the drive unit(s) or the rotatable/pivotable assembly(ies) in motion. In practice, this means that the greater the amount of work required of the drive system, the more fuel $V_T$ is consumed by the internal combustion engine installed on board the aforesaid vehicle and/or construction machine.

In general:

$$W_{drive} = \int [M(\text{rotation angle}) \cdot d(\text{rotation angle})],$$

where the fuel consumption, proportional to the work performed by the drive system, is as follows:

$$V_T \sim W_{drive}$$

This fuel consumption is often considered disadvantageous, since fuel is consumed in particular even when the internal combustion engine is in so-called "idle mode," i.e., even when the drive unit(s) or the rotatable/pivotable assembly(ies) need not be set in motion for a time.

However, since the aforesaid vehicles and/or construction machines, particularly underground tunneling machines, port and ship cranes, bucket-wheel excavators or the like, are of course in use for a large proportion of their working hours but need not travel large distances as they work, the internal combustion engine(s) actually do(es) spend a great deal of time in so-called "idle mode." This generates costs and reduces the service life of this (these) internal combustion engine(s). No real demand-oriented drive system for drive unit(s) or rotatable/pivotable assembly(ies) is available for broad-based application to large and heavy vehicles, heavy-duty vehicles and/or construction machines at this time, particularly such a drive system that offers high drive torque in the low rpm range, for instance by means of suitable electric motor components.

Also disadvantageous is the mere necessity, in most cases, of the aforesaid shiftable transmission, which is mechanically coupled to the internal combustion engine(s) located on the vehicle. This additional (mechanical) transmission component often is not integrated into the internal combustion engine, but must be acquired separately and at additional cost.

From the disadvantages of the described prior art comes the problem initiating the invention, that of creating or improving on a drive mechanism of the aforesaid kind in such a way that rotation variables such as the direction, speed and/or angle of rotation can be influenced as directly and instantaneously as possible, thus eliminating the need for (a) separate mechanical transmission component(s).

It is also an object of the invention to provide a drive mechanism that eliminates the need for internal combustion engines and is capable of maintaining high torque at low rotation speeds. The invention is intended to be as widely usable as possible, i.e., not only in stationary machines, but also on (heavy-duty) vehicles and/or (construction) machines.

Object and Description of the Invention

SUMMARY OF THE INVENTION

This problem is solved by means of the following invention. It is an essential aspect of the invention that connecting elements, particularly rings, mounted rotatably relative to each other are provided with electromechanical equipment, such that at least one fully circumferentially extending row of magnets is arranged inside the gap on one connecting element and at least one fully circumferentially extending row of coils is arranged directly opposite said magnets on the other connecting element.

The drive itself is thereby spread out in a ring shape and is integrated directly into the rotatable mounting. The primary concern here is to avoid play of any kind, since there is no mechanical transmission of any kind. There is also, consequently, no wear-prone coupling, thus simplifying the maintenance of the drive mechanism. A further consideration is the resulting decrease in the number of external parts, which might, for example, be damaged by collisions. Space is also saved. Torque induction that is distributed over the circumference of the gap can be considered nearly ideal, i.e., free of axial or radial forces, whereas, for example, pointwise induction by means of a pinion or a worm gear engaging with a toothing not only generates torque, but, due to the lack of symmetry, generally also produces a directional horizontal force that places additional stress on the rolling elements. Furthermore, in an open-center large rolling bearing a large number of coils and magnets can be disposed along the circumference of a gap, thus creating a good cooling effect with a specified power density and also achieving very smooth operation.

It has proven favorable for the gap to open onto two different end sides of the drive mechanism. The drive mechanism is consequently divided into an outer connecting element and an inner connecting element. Since these overlap regionally in the radial direction, a direct axial pressure line can be constructed for deformation-free transmission of axial pressure forces.

It is also recommended that the connecting surfaces of the two connecting elements be disposed on mutually facing end sides of the drive mechanism. On the one hand, this facilitates the assembly of two machine parts or system parts disposed next to each other or one above the other; on the other hand, in such cases, assuming that the axis of rotation is arranged approximately vertically, the weight force of the load-imposing machine part can be transmitted as axial pressure force between the two connecting surfaces.

Taking this inventive idea farther, the invention provides that two connecting elements are braced directly against each other in the axial direction via at least one rolling element row disposed between them, the respective raceway on each of the two connecting elements being formed, together with the respective planar connecting surface, from a respective common base body. This gives the assembly maximal rigidity against the transmission of axial pressure forces, with the result that even heavy axial loads can be supported without problems.

At least one connecting element can be provided with a ring-shaped collar suitable to be clamped, preferably in the axial direction, between two brake shoes. This measure makes it possible, after precise adjustment of a system part or machine part to be rotated, to fix the respective position by means of a brake in such a way that maintenance of the desired position is assured even under high forces or torques, for example during the machining of large annular workpieces.

It is within the scope of the invention that a plurality of magnets are interconnected, for example by a common support body such as a joining plate or the like, to form a common segment body. On the one hand, assembly can be prepared for and simplified in this way. In addition, such magnet segment bodies can easily be fabricated with high repeat accuracy using templates or the like, which is important not only for the geometrically parallel alignment of the magnets, but also with a view toward maintaining a constant distance from the particular gap wall or the opposite row of coils.

The magnets should be arranged such that their respective magnetic north and south poles alternate in the circumferential direction.

It has proven beneficial for the magnets to be arranged in a plurality of approximately axially parallel rows, such that the magnetic north and south poles in one row are all oriented parallel to one another.

The invention further recommends that the rows extend, not exactly parallel to the axis of rotation of the drive mechanism, but at a slight angle thereto, where appropriate in two different circumferential directions in different sections.

A further design rule provides that the coils be fastened, particularly tightly screwed, to cores which in turn are tightly screwed to a circumferential surface in the region of the gap.

Further advantages can be gained if the gap section receiving the rolling elements is offset in the axial direction from the gap section receiving the magnets and coils.

If the gap section receiving the rolling elements is separated by a fully circumferential seal from the gap section receiving the magnets and coils, on the one hand, the lubricant that is present in the bearing section to keep the rolling elements well lubricated is kept out of the drive section, where the magnets and coils face each other in the radial direction; so in that location, where lubrication is completely superfluous, no braking torque is generated and the two connecting elements are instead able to move past each other without friction.

If a plurality of coils are interconnected to form a common segment body, assembly is simplified to the extent that the coils do not all have to be tightly screwed to the particular connecting element individually.

The interconnection of the coils can take place on the back side of the section of the particular connecting element that supports the coils, or in the region of a mouth of the gap.

In addition, the contacting of the coils can be effected via bores in the section of the particular connecting element that supports them, or in the region of a mouth of the gap.

A plurality of coils should be connected in series to form one or more strings. This has the advantage that all the coils in a string are traversed by a current of the same amplitude, and thus exactly the same magnetization is induced. The drive power is therefore distributed evenly over all the coils in a string.

The invention prefers that three strings of coils be provided, corresponding to a three-phase current system. In the case of excitation with currents having a sinusoidal amplitude and an electrical offset between two phases of 120° or 240°, respectively, a three-phase current system has the advantage of a power flow that is completely constant over time. In the context of the invention, this has a favorable effect on the synchronization properties of a rolling bearing driven in this manner.

It is possible for each string to have 10 coils or more connected in series, for example respectively 20 coils or more, preferably 30 coils or more, particularly 40 coils or more. The greater the number of coils, the better the synchronization. In the case of excitation at the same frequency, a multi- or even high-pole machine, though it runs more slowly than a single- or low-pole machine, can be regulated with much higher precision.

The strings are preferably connected at one end in a star or a delta configuration. In the former case, the string voltages correspond to the phase voltages of a supplying three-phase current system; in the latter case, they correspond to the concatenated voltages. Since the concatenated voltages are higher than the phase voltages, the drive power can be varied in this manner.

At its respective other end, each string is to be supplied by a current converter, particularly by a three-phase converter or a three-phase inverter. If the current values and/or voltage values output by that device are sinusoidal, the drive power can be controlled or regulated with maximal precision.

Alternatively, instead of sinusoidal current or voltage signals, it is also possible to employ burst mode operation, in which the individual phase voltages are merely switched on or off. An intermediate stage is also conceivable, in which the phase voltages or phase currents are defined, not as sinusoidal, but in one or more steps, for example 0 V, ±½ $U_N$, ±$U_N$, or 0 V, ±⅓ $U_N$, ±⅔ $U_N$, ±$U_N$, etc., or an equivalent stepped current regulation scheme.

Finally, the teaching of the invention includes a rotation angle sensor, for example in the form of an incremental encoder. This could, for example, scan along incremental graduations provided along a circumferential surface of the drive mechanism to obtain information on the exact rotation angle position of the device concerned. Depending on the precision of the incremental scale, the control system can thus be imparted correspondingly high precision. It should be kept in mind that in many applications, the precision of a feedback position control system is of maximum importance, whereas other parameters, such as dynamics or the developable torque, are secondary, for example in the case of machining equipment for forming teeth in large gear rings, where, after a tooth space is milled, the machining table supported and driven by a drive mechanism according to the invention must be advanced by exactly one tooth pitch, so that after a complete revolution, the last tooth space is exactly the same distance from the very first tooth space as all the other tooth spaces are from each other. If a drive mechanism used for this purpose is provided with a braking device that locks the machining table and the workpiece fixed on it in place during the actual milling process, then no special torque is needed to maintain high precision.

A preferred application according to the teaching of the invention is the use of the invention on a ship, a vehicle or heavy-duty vehicle and/or on a construction machine. In practice, for example heavy-duty cranes or mobile cranes, bucket-wheel excavators or port/ship cranes or load-lifting machines, or even tunneling machines, have proven to be especially practical fields of application. In such cases, at least one drive mechanism is used to set in motion or rotationally drive at least one drive unit, preferably a set of wheels and/or chains.

This use case is advantageous particularly because in the ideal case the mechanical steering gear that has been necessary heretofore can be completely replaced by the invention.

If the invention is not used directly to move the aforesaid wheels and/or chains, then the use of the present invention also offers advantages for setting in motion or rotating any types of large and/or heavy assemblies. Such types of assemblies can be towers or gun carriages, but also excavator arms or a lifting arm or boom lift/platform lift or even pivotable operator's cabs of cranes, from which the crane operator monitors and controls the work.

Telescopic booms or rotating ladder platforms can also be driven by means of the invention, in a particularly advantageous embodiment even boring heads of tunnel-building or tunnel-boring machines.

All the last-cited use cases have in common the fact that the particular rotatable or pivotable assembly allows itself to be placed directly, for example in abutment or in a flange-like manner, against at least one of the connecting elements of the invention and can be fastened to the drive mechanism by fastening means, preferably screw connections, that are arranged distributed in a crown shape. In ordinary practice, the axis of rotation of the particular drive mechanism is then aligned with the center axis or axis of rotation of the assembly.

In a further, advantageous, embodiment of the invention, the latter is suitable for use as a rotary bearing in automatic beverage bottle machines, particularly bottle filling machines and/or automatic stretch blow machines for making PET plastic bottles. In such cases, the drive mechanism is firmly connected, particularly screwed, to a rotatable assembly that is able to, for example, receive or hold a multiplicity of beverage bottles. The direct and unmediated, i.e., gearless, electronic controllability of the invention furnishes the advantage of exact positionability of the annularly held or received bottles. It has proven especially advantageous in the context of this embodiment to use toothed ball joints: In that case, the rolling elements are balls and at least one of the rings of the invention is toothed, particularly having angled teeth.

In another embodiment of the invention, the latter is suitable for functioning as a directly electrically drivable or driven cable drum or rope drum. In said embodiment, the drive mechanism is firmly connected, particularly screwed, to a rotatable assembly that is configured as ring- or cylinder-shaped and is surrounded along a jacket surface of said ring or cylinder shape by filiform, but extremely flexible, cable material or rope material. In the case of electrical control of the terminal box of the invention, the drive is set in rotary motion and the rope or cable can thus be unwound or wound up, depending on the polarity of the control.

BRIEF DESCRIPTION OF THE DRAWINGS

Further features, details, advantages and effects based on the invention will become apparent from the following description of a preferred embodiment of the invention and by reference to the drawing. Therein.

DETAILED DESCRIPTION OF THE PREFERRED EMBODIMENT

Figure 1:
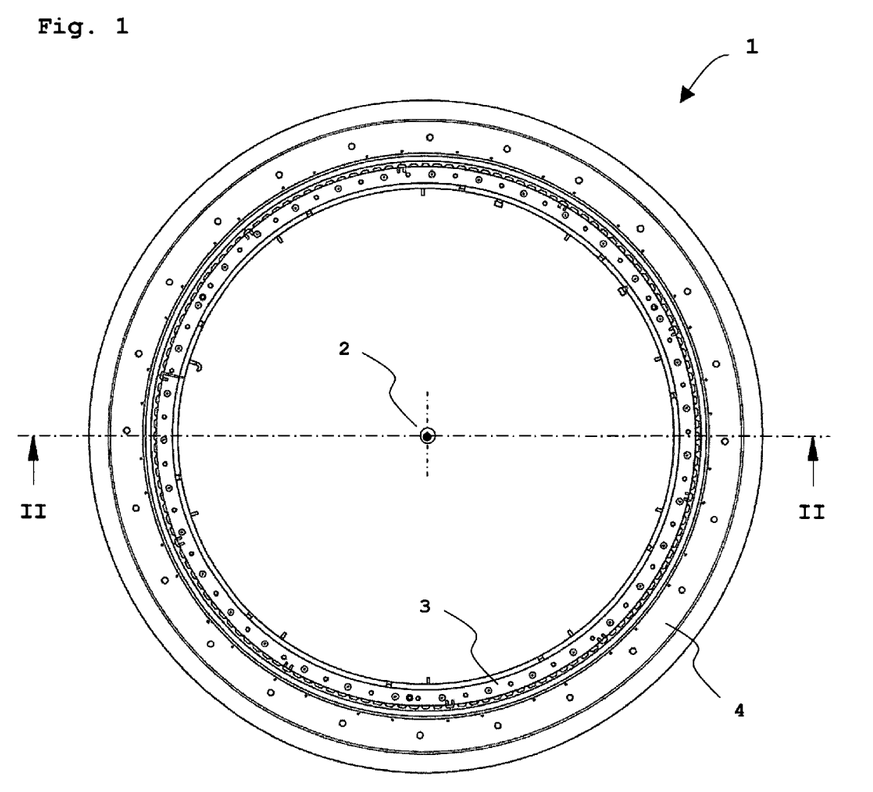
FIG. 1 shows a drive mechanism according to the invention in a plan view of an end side.
Figure 2:
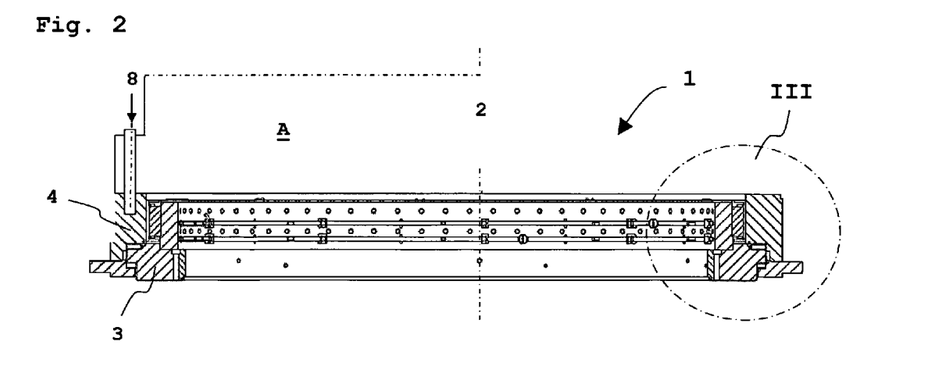
FIG. 2 is a section through FIG. 1 along line II-II, schematically indicating on the left side of the drawing an assembly (A) fastened by fastening means (8).

As can be appreciated from FIG. 1, the drive mechanism 1 according to the invention for rotatably coupling two system parts or machine parts or the like has a ring-shaped structure and is rotationally symmetrical to a center axis 2 of said ring structure.

An essential element of the drive mechanism 1 is two ring-shaped, substantially planar connecting elements 3, 4.

Figure 3:
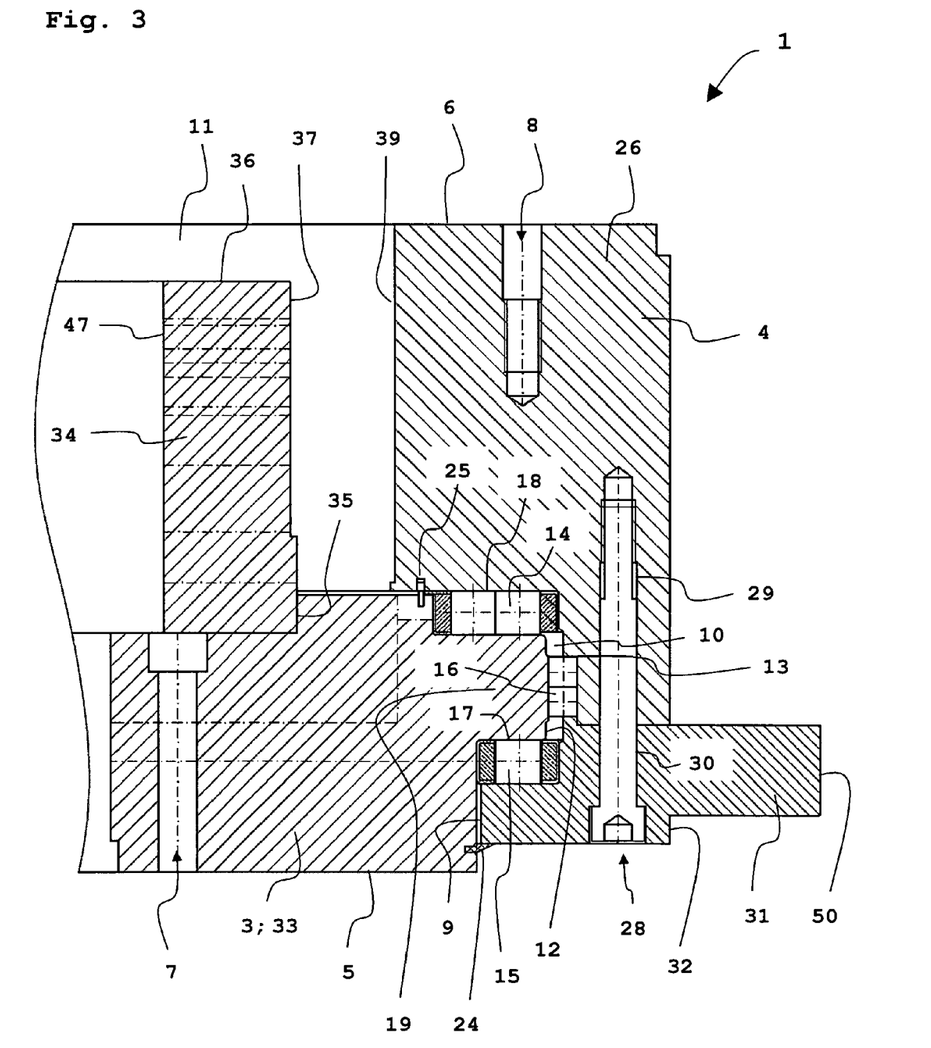
FIG. 3 shows detail III from FIG. 2 in an enlarged representation, but without an installed drive mechanism.

Each of these connecting elements 3, 4 is provided with at least one respective planar connecting surface 5, 6 together with fastening means 7, 8, arranged distributed in a crown shape therein and provided for connection to different system parts or machine parts or the like. These fastening means are preferably bores for receiving fastening screws, for example internally threaded blind bores or through-bores. The connecting surfaces 5, 6 of the two connecting elements 3, 4 are preferably located on oppositely disposed end sides of the drive mechanism 1, i.e., for example, one at the top and one at the bottom as depicted in FIG. 3.

The two connecting elements 3, 4 are arranged concentrically with the common center point 2, through which passes—perpendicularly to the main plane of the connecting elements 3, 4—the axis of rotation 2 about which the two connecting elements are able to rotate relative to each other.

In addition, the two connecting elements 3, 4 are arranged radially one inside the other; in the example illustrated, connecting element 3 is radially inside the central opening of the other connecting element 4.

Between the two connecting elements 3, 4 there is a gap-shaped interspace 9 that is divided essentially into two sections, specifically into a bearing section 10 and a drive section 11.

The width of the gap 9 is dimensioned such that the mutually facing surfaces 12, 13 of the two connecting elements 3, 4 are farther apart from each other in the drive section 11 than in the bearing section 10, with the result that more space is left in the drive section 11 than in the bearing section 10, at least as long as no additional parts are received therein.

As can be understood from FIG. 3, disposed in the bearing section 10 are one or more rows of rolling elements 14, 15, 16, each row whereof rolls between a respective two raceways 17, 18 on the two connecting elements 3, 4, thus enabling same to rotate relative to each other.

In the illustrated example, there is a plurality of rows of rolling elements 14, 15 with a large pressure angle or contact angle α of more than 45°, for example 60° or more, preferably 75° or more, particularly approximately 90°, and at least one row of rolling elements 16 with a small pressure angle or contact angle α of less than 45°, for example 30° or less, preferably 15° or less, particularly approximately 0°. The pressure angle or contact angle α is measured in this case between the radial or main plane and the line of the pressure acting on a rolling element. The radial or main plane of the drive mechanism 1 is intersected perpendicularly by the axis of rotation 2.

Said rolling elements 14, 15 with a large pressure angle or contact angle α are responsible for the parallel alignment of the main planes of the two ring-shaped connecting elements 3, 4. In the example shown, there are two rows of such rolling elements 14 for transmitting axial pressure forces between the connecting surfaces 5, 6 on opposite end sides of the drive mechanism 1, while one row of such rolling elements 15 serves to transmit axial pressure forces between these connecting surfaces 5, 6.

To achieve this, one of the two connecting elements 3, 4—in the example shown, the radially inwardly disposed connecting element 3—has a fully circumferentially extending collar 19 of approximately rectangular cross section that protrudes radially to the other connecting element 4, 3 and is embraced—spaced by the gap 9—by the other connecting element 4.

A raceway 17 for the row(s) of rolling elements 14 transmitting axial pressure forces is disposed on the connecting surface 5 of the connecting element 3, 4 carrying the collar 19—in FIG. 3, on the top side 20 of the collar 19—while a raceway for the row(s) of rolling elements 15 transmitting axial tensile forces is provided on the opposite side of the collar 19—in FIG. 3, on its bottom side 21.

The rolling elements 16 having a small pressure angle or contact angle α roll along a raceway 17 on the end side 22 of the collar 19.

All these rows of rolling elements 14, 15, 16 have their respective other raceway 18 on the inner side of a fully circumferentially extending depression 23 surrounding the collar 19 and disposed on the respective other connecting element 4, 3.

The illustrated embodiment has roller-shaped rolling elements 14, 15, 16, but this is not mandatory; other rolling element geometries may be contemplated, for example spherical rolling elements 14, 15, 16. Naturally, different rows of rolling elements 14, 15, 16 can also have different rolling element geometries.

The bearing section 10 of the gap 6 is sealed on each side—i.e., beyond the innermost rolling element row 14, on the one side, and outside of the outermost rolling element row 15, on the other side—by at least one respective fully circumferentially extending sealing element 24, 25, and can thus be filled with a lubricant—preferably with grease—which the sealing elements 24, 25 prevent from leaking out, on the one side, and from getting into the drive section 11, on the other side.

To avoid problems during the assembly of the drive mechanism 1, the connecting element 3, 4 that has the depression 23 embracing the collar 19 is divided in the region of the depression 23, in a plane parallel to the main or radial plane of the bearing, into a ring 26 provided with connecting surface 6 and a ring 27 detachably fixed thereto. This connection is preferably made by means of screws 28 that are arranged distributed in a crown shape and extend parallel to the axis of rotation 2 of the bearing, and that engage in mutually aligned bores 29, 30 in said two rings 26, 27 and are tightly screwed therein. One row of bores 29 provided for this purpose is preferably embodied as internally threaded blind bores, while the other bores are embodied as through bores.

In the illustrated embodiment, the ring 26 comprising connecting surface 6 has a larger cross section than ring 27 fixed thereto. This is due primarily to the smaller height of the latter. However, one of the two rings 26, 27—in the illustrated example, the ring 27 opposite the connecting surface 6 of the particular connecting element 3, 4—can have a radial extension in the form of a fully circumferential collar 31 on its jacket surface 32 facing away from the gap 9. This collar 31 has approximately the shape of a brake disk and can be embraced axially by brake shoes to fixedly brake the particular connecting element 3, 4.

A braking device can be useful in particular when—as the invention further provides—the inventive drive mechanism 1 is part of a clamping jig for a workpiece that is to be machined. The braking device can then be tightened during a machining step—i.e., while a workpiece is engaged—whereas it is released for rotational adjustment and calibration.

For the rotary positioning of large workpieces, a rotating mechanism 1 according to the invention can be installed in a round rotary table, particularly in a horizontal orientation below and parallel to the table surface. The table plate or support plate would then be placed on top of the highest connecting surface 6 and screwed down tight, while the brake is anchored to the base or frame of the machine tool.

As can further be seen from FIG. 3, the section through the drive mechanism 1 reveals an approximately axial, i.e. vertical, line that extends between the two connecting surfaces 5, 6 and passes through the pressure/rolling elements 14. The rotating mechanism 1 thus is designed to have maximal rigidity to axial pressure forces.

Furthermore, a respective one of the two raceways 17, 18 for the pressure/rolling elements 14 is formed by machining or shaping a base body, into which the connecting surface 5, 6 of the particular connecting element 3, 4 is also incorporated or shaped.

As can further be seen from FIG. 3, the connecting element 3, 4 comprising the collar 19 is also divided into two rings 33, 34. One of them—in the embodiment shown in FIG. 3, the lower ring 33—bears the connecting surface 5 of the particular connecting element 3, 4 and the collar 19 and essentially bounds the bearing section 10 of the gap 9, whereas the drive section 11 of the gap 9 is bounded primarily by the other ring 34, at least in the radial direction. The two rings 33, 34 are fixedly connected to each other by a plurality of fastening means arranged distributed in a crown shape. This connection can preferably be embodied similarly to the connection between the two rings 26, 27, i.e., via screws that are turned in mutually aligned bores.

As can further be seen from FIG. 3, the drive section 11 of the bearing gap 9 has a greater width W than the bearing section 10, to leave sufficient space for the yet-to-be-installed drive mechanism. The width W of the drive section 11 can be, for example, on the order of a few centimeters, for example between 1 cm and 20 cm, preferably between 2 cm and 15 cm, particularly between 5 cm and 12 cm.

The height of the ring 34 flanking the drive section 11 in this case is approximately equal to the axial extent of the drive section 11 of the bearing gap 9. The resulting height extent H of the drive section 11 parallel to the axis is preferably greater than its radial width. It can also be on the order of a few centimeters, for example between 2 cm and 40 cm, preferably between 5 cm and 30 cm, particularly between 10 cm and 25 cm.

Where appropriate, the two rings 33, 34 can be centered on each other, for example in that the ring 33 forming the bearing section 10 of the gap 9 has a fully circumferential channel 35 into which the adjoining region of the other ring 34 can be exactly fitted.

The upper, free end side 36 of the ring 34 bounding the drive section 11 of the gap 9 terminates below the connecting surface 6 formed at that end side, i.e., in front of it in the axial direction or within it.

The assembly installed in the drive section 11 of the gap 9 is divided into two mutually separate constructional units:

Whereas electrical coils 38 are fastened to one flank 37 of said drive section 11, magnets 40 are fastened to the opposite flank 39.

A multiplicity of coils 39 are arranged one after another in the circumferential direction of the gap 9. So that they can be supplied from a three-phase electrical current system, i.e., for example having three phases R, S, T, their number should be divisible by 3.

Since the diameter of that flank 37 of the drive section 11 of the bearing gap 9 which carries the coils is preferably greater than 1 meter, preferably 2 meters or larger, particularly 3 meters or more, this flank 37 consequently has a circumference C on the order of 3 meters or more, preferably of 6 meters or more, particularly of 9 meters of more.

With such a large circumferential length, there would be no difficulty arranging a larger number n of coils 38 successively in a row, for example 60 coils 38 or more, preferably 90 coils 38 or more, particularly 120 coils 38 or more.

The coils used for this purpose are preferably thin coils 38 having a height h parallel to the axis that is greater than their azimuthal extent a in the circumferential direction. If they are tightly spaced, the following requirement results:

$$H > h > a = C/n = D \cdot \pi/n.$$

The height H of the flank 37 parallel to the axis is greater than its circumference C divided by the number n of coils 38.

The cross section of the wire used for the coil winding should be chosen to be large enough to permit currents I in the range of 1,000 A or more.

Preferably, a plurality of coils 38 are connected in series in each case, preferably to form three strings R, S, T. Every third coil 38 in this case is assigned to a common string R, S, T and the respective two intervening ones to the other two strings R, S, T. This interconnection can take place, for example, in the region of the respective adjoining mouth of the gap 9.

Figure 7:
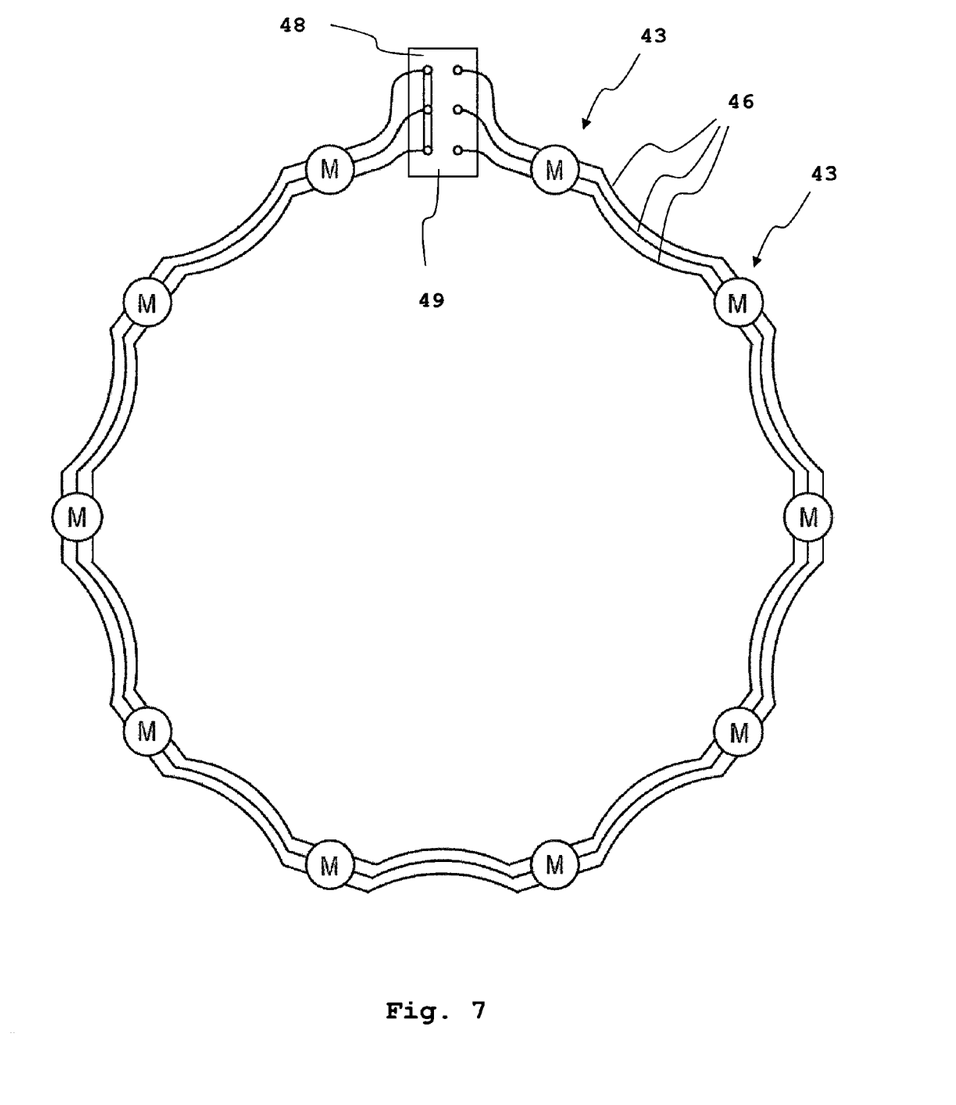
FIG. 7 is a circuit diagram for the electrical contacting of the individual coil segments.
Figure 8A:
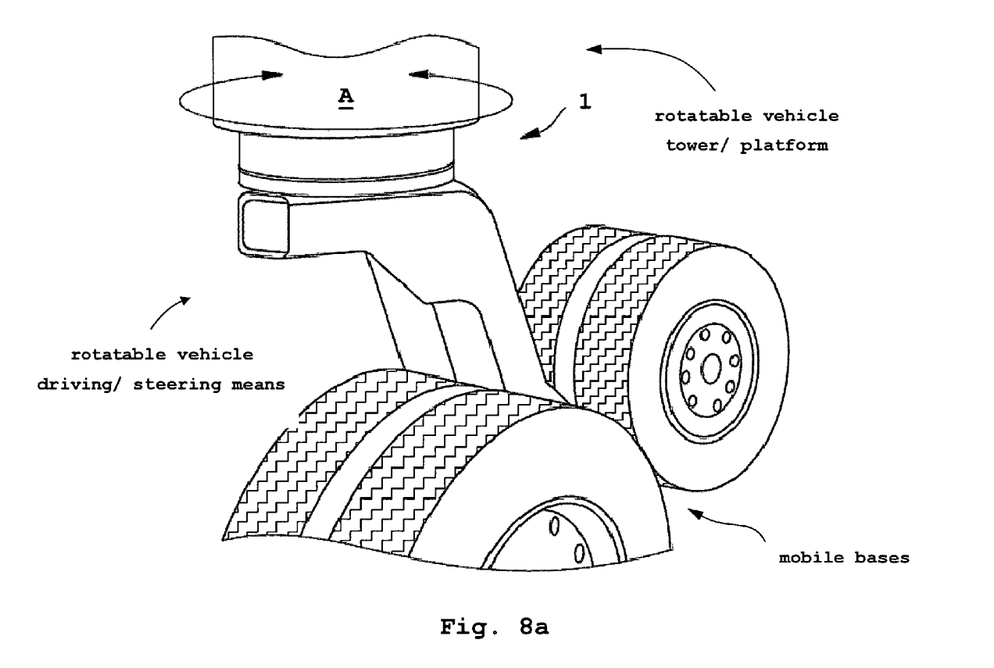
FIG. 8a illustrates one possible application of the inventive mechanism to driving a set of wheels, replacing a mechanical steering gear(s).
Figure 8B:
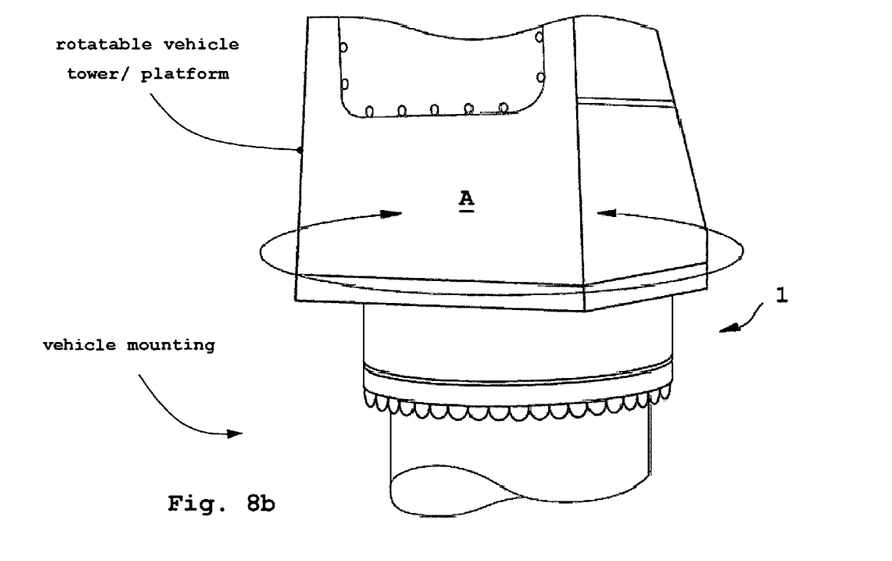
FIG. 8b shows a second possible application of the inventive mechanism to driving a rotatable assembly (A), where said assembly constitutes the upper portion of a rotatable tower on a vehicle (ship).
Figure 9A:
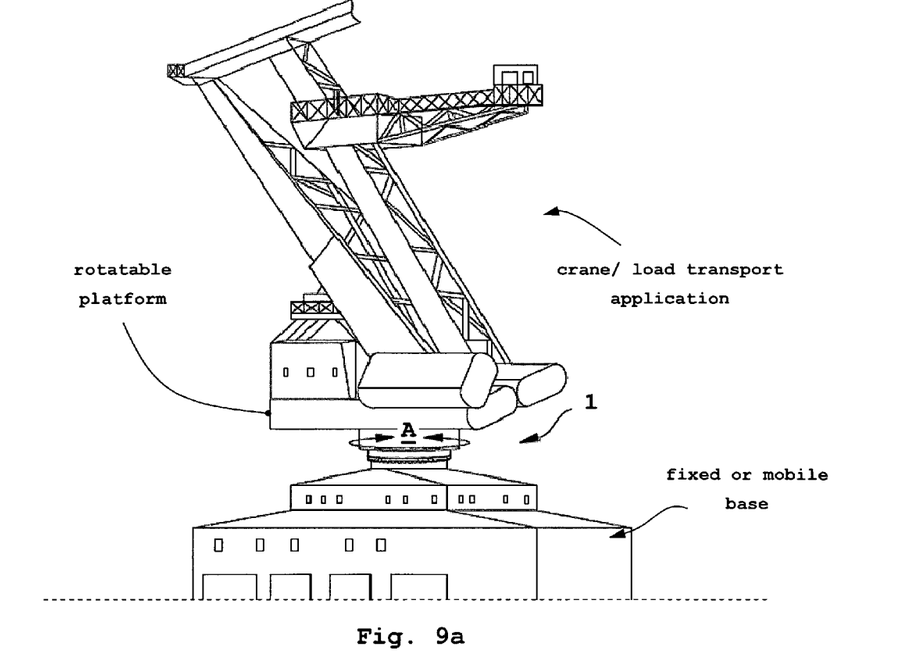
FIG. 9a shows a third possible application of the inventive mechanism to driving a rotatable assembly (A), where said assembly constitutes the upper portion of a rotatable tower on a large construction crane (port crane/construction machine).
Figure 9B:
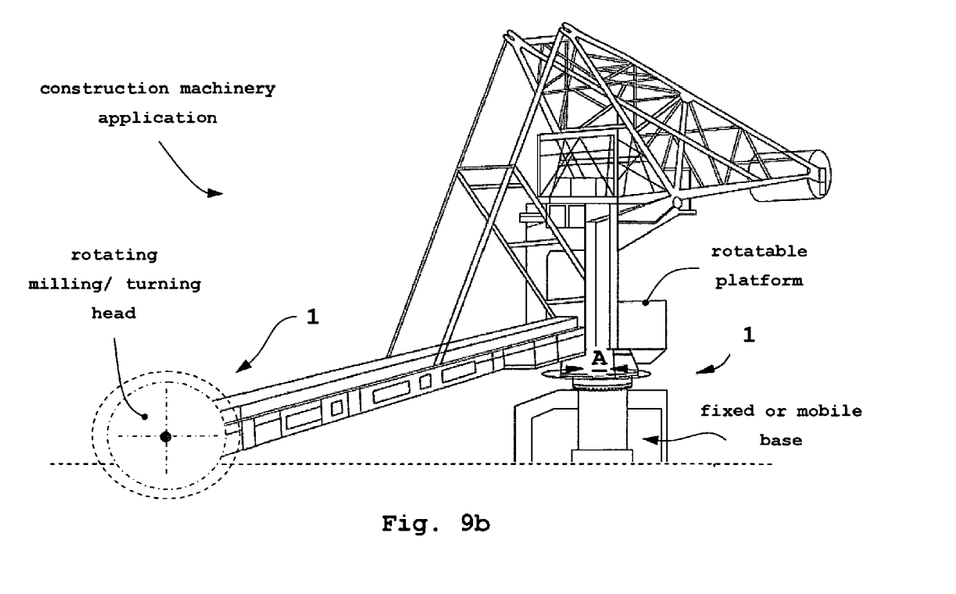
FIG. 9b shows a third possible application of the inventive mechanism to driving a rotatable assembly (A), where said assembly constitutes the upper portion, pivotably or rotatably implemented, of a large bucket-wheel excavator (construction machine).

In this way, a plurality of adjacent coils—for example 12, 15 or 18—can be connected to one another to form segments 41, which are illustrated in FIG. 7. Such segments 41 can then be installed or removed together.

One or more coils 38 preferably rest on a core body or segment body 42, preferably made of a magnetically soft material. The coils 38 can be wound separately therefrom and then slid onto the core body or bodies 42. These core bodies 42 are then fastened—preferably screwed, by a plurality of radial screws—to the designated flank 37 of a connecting element 3, 4 in the region of the drive gap 11.

To hold the coils 38 immovably in place, they should be embraced on the gap side by the core body or bodies or the segment body or bodies 42. To achieve this, the radial extent, referred to the bearing rotation axis 2, of the core bodies or segment bodies 42 is greater than the relevant dimension of the coils 38, and the latter are inserted in channels and/or groove-shaped depressions on the surface of the core bodies or segment bodies 42 facing away from the gap 9. In the case of core bodies 42 intended to hold individual coils 38, a channel running around the edge will suffice for this purpose; segment bodies 42 for a plurality of coils 38, however, should always have groove-shaped depressions in the inner region.

After all the core or segment bodies 42, including the electrical coils 38, have been fixed in place, these coil segments 43 are electrically connected to one another, particularly respectively in a three-phase manner, i.e., so as to form three strings R, S, T, as can be seen in FIG. 7.

Figure 4:
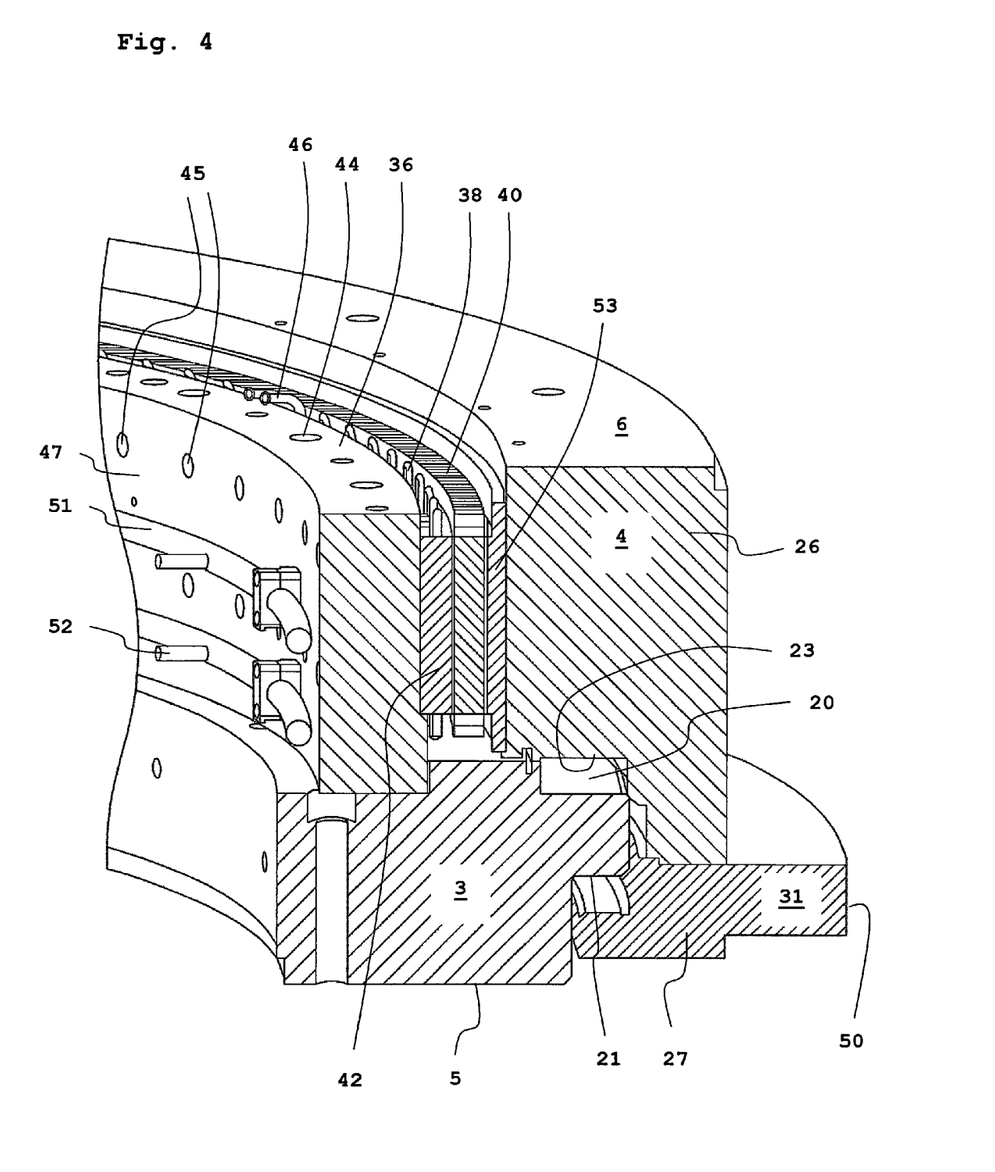
FIG. 4 is a perspective view of the cross section according to FIG. 3 after the installation of the drive mechanism, viewed from an approximately tangential direction.
Figure 5:
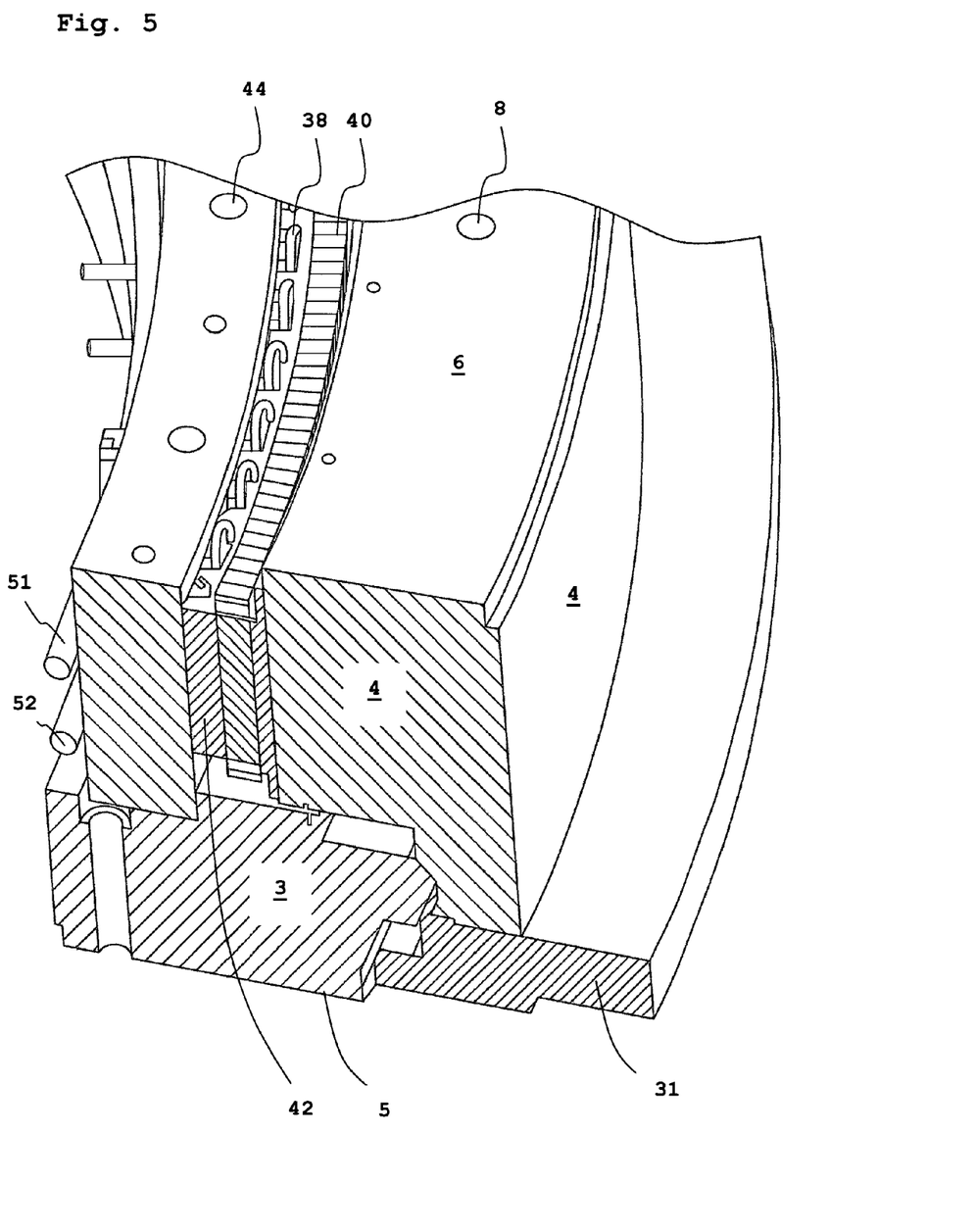
FIG. 5 shows approximately the same detail as FIG. 4, also in perspective representation, but viewed from an approximately axial direction.

As can be understood from FIG. 4, axial connecting bores 44 for receiving connection screws for interconnecting the two rings 33, 34 should be offset in an azimuthal direction from the radial connecting bores 45 for receiving connecting screws for fastening the core bodies or segment bodies 42 to the gap flank 37. To ensure a constant such offset, the number $b_1$ of axial connecting bores 44 and the number $b_2$ of radial connecting bores 45 should be whole multiples or fractions of the number n of electrical coils 38:

$$b_1 = k_1 \cdot n, \text{ where } k_1 \epsilon Q;$$

$$b_2 = k_2 \cdot n, \text{ where } k_2 \epsilon Q.$$

In the ideal case, it might be that $b_1 = b_2 = n$.

The terminal connections 46 to individual coil segments 43—or at least to the first and last coil segment 43 in a string—can be routed past the free end side 36 of the gap region 9 bounding the drive section 37 or through bores in the ring 34 to that jacket surface 47 of said ring 34 which is disposed opposite the coils 38, and can there be connected to one another or to a supply voltage.

The strings R, S, T are preferably connected at one end 48 in a star or a delta configuration, while the respective other end is contactable with a supply voltage, for example in a terminal box 49. All the string ends 48, R, S, T can be terminated there, so that the choice between star and delta connection and the choice of phase sequence or direction of rotation is left up to the user.

The power supply to the various strings R, S, T is preferably effected via a current converter, a three-phase converter or an inverter, particularly with an approximately sinusoidally modeled output current and/or output voltage.

A supplying current converter, three-phase converter or inverter can be controlled by a rotation speed regulator. To make it possible to reach a specified position precisely, it is advisable to provide a position regulator.

To route the supply lines to the coils 38 without mechanical twisting, it is advisable for the connecting element 3, 4 carrying the electrical coils 38 to be non-rotatably fastened to a frame or base. The current converter can also be placed adjacent thereto or in the vicinity thereof.

The connecting element 3, 4 equipped with the electrical coils 38 will therefore be designated the stator in the following discussion, and the connecting element 4, 3 that is rotatable with respect to it will accordingly be designated the rotor. In the representation of FIG. 3, therefore, the radially inwardly disposed connecting element 3 is the stator and the connecting element 4 outwardly surrounding it is the rotor.

For regulation—of rotation speed or of position—a rotation or position sensor can be disposed at an exposed location on the rotatable rotor/connecting element 3, 4.

For rotation angle detection, the invention recommends arranging, for example gluing, an incremental sequence on the outwardly disposed end side 50 of the collar 31 on the rotor/connecting element 3, 4, which incremental sequence can be scanned by an incremental encoder to detect the current rotation position with high accuracy.

The function of rotation angle detection can be performed by two scanning devices offset from each other in the circumferential direction by approximately 90°, referred to a period of the incremental sequence, such that conclusions regarding the direction of rotation of the rotor/connecting element 3, 4 can be drawn from the sequence of the arriving pulses.

Should the drive mechanism be required to furnish high outputs, this may result in high heat generation in the stator 3, 4. To prevent overheating, which, for example, could compromise the insulation of the winding, a cooling arrangement can be provided for the stator 3, 4. For this purpose, two lines 51, 52, particularly pipes, in which a coolant can circulate, can be laid on that jacket surface 47 of the stator 3, 4 which is opposite the coils 38.

Such lines 51, 52 can provide cooling in and of themselves, by virtue of their thermal contact with the particular jacket surface 47. To intensify the cooling effect, it can also be provided that inside the connecting element 3, 4, i.e., inside the ring 34 carrying the coils 38, cooling bores are provided that connect two cooling lines 51, 52 at regular circumferential intervals, so the coolant is conveyed not only along the stator 3, 4, but also right through it.

Figure 6:
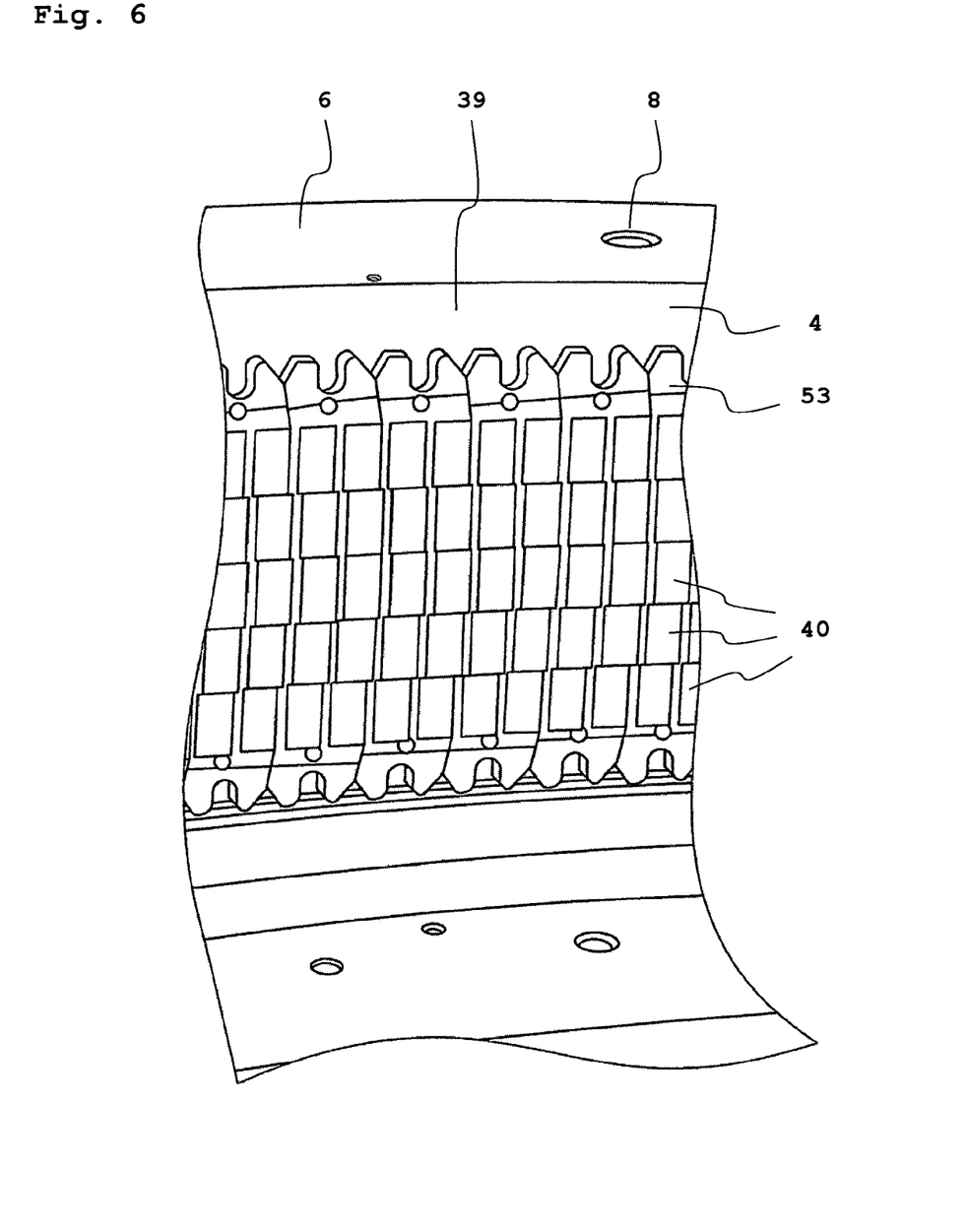
FIG. 6 is a view of the inner side of the outer connecting element, partially broken away.

The magnets 40 that are fixed to that flank 39 of the drive section 11 which is opposite the coils 38 can be recognized in FIG. 6.

To prepare for and simplify assembly, the magnets 40 can also be connected segmentally to one another right from the start, so the magnets 40 do not all have to be fastened to the flank 39 individually.

To segmentally connect a plurality of magnets 40, the latter are first fastened, preferably glued, to relatively thin, flat support elements 53, preferably metal sheets. The support elements 53 preferably consist of soft iron.

These support elements 53, together with the magnets 40 fastened or glued thereto, are then fixed—particularly screwed, preferably by means of radial screws—to the flank 39 in the region of the drive section 11 of the rotor/connecting element 3, 4.

The magnets 40 are permanent magnets and are preferably magnetically hard, preferably with a particularly high pole strength. Magnets with rare-earth components have proven particularly useful due to their high pole strength; examples include samarium/cobalt or neodymium magnets or magnets made of NdFeB, an alloy of neodymium, iron and boron. If the requirements with regard to the achievable nominal torque are modest and/or the nominal torque is not critical due to the design size and number of poles of the machine, ferrite magnets may also be sufficient.

The magnets 40 are relatively small and have the shape of a small plate or disk or are square. A large number of them are glued to the particular support element 53.

Since the dimensions of such a magnet 40 are smaller than the axial extent of the coils 38, a plurality of magnets 40 having the same direction of polarity are usually placed one on top of the other in the axial direction, i.e., respectively either with a north magnetic pole facing the gap 9 or with a south magnetic pole directed toward the gap 9.

In the azimuthal direction or in the circumferential direction along the gap 9, adjacent magnets 40 preferably have different directions of polarity, i.e., next to a magnet 40 or an axial row of magnets whose north magnetic pole faces the gap 9 is a magnet 40 or an axial row of magnets whose south magnetic pole faces the gap 9.

The invention further recommends that the axial rows of magnets 40 polarized in the same respective direction not be oriented exactly parallel to the axial direction, but instead at a slight angle thereto, or in a slight > shape with an opening angle of approximately less than 180°, i.e., for example with an opening angle of 175° or less, preferably with an opening angle of 170° or less. A slight tilt of this kind causes the manifestation of the magnetic poles in the circumferential direction to be "slurred" slightly, thus improving the synchronization of the electrically driven rolling bearing 1.

List of reference characters:

| | |
|---|---|
| 1 | Drive mechanism |
| 2 | Axis of rotation |
| 3 | Connecting element |
| 4 | Connecting element |
| 5 | Connecting surface |
| 6 | Connecting surface |
| 7 | Fastening means |
| 8 | Fastening means |
| 9 | Gap |
| 10 | Bearing section |
| 11 | Drive section |
| 12 | Gap surface |
| 13 | Gap surface |
| 14 | Rolling element |
| 15 | Rolling element |
| 16 | Rolling element |
| 17 | Raceway |
| 18 | Raceway |
| 19 | Collar |
| 20 | Top side |
| 21 | Bottom side |
| 22 | End side |
| 23 | Depression |
| 24 | Sealing element |
| 25 | Sealing element |
| 26 | Ring |
| 27 | Ring |
| 28 | Screw |
| 29 | Bore |
| 30 | Bore |
| 31 | Collar |
| 32 | Jacket surface |
| 33 | Ring |
| 34 | Ring |
| 35 | Channel |
| 36 | Free end side |
| 37 | Flank |
| 38 | Electrical coil |
| 39 | Flank |
| 40 | Permanent magnet |
| 41 | Segment |
| 42 | Core body |
| 43 | Coil segment |
| 44 | Connecting bore |
| 45 | Connecting bore |
| 46 | Terminal connections |
| 47 | Jacket surface |
| 48 | End |
| 49 | Terminal box |
| 50 | End side |
| 51 | Line |
| 52 | Line |
| 53 | Support element |
| A | Assembly (rotatable) |

The invention claimed is:

1. A drive mechanism (1) for rotatably coupling a first system part or machine part, preferably an assembly (A), to a base, pedestal or frame or to a second system part or machine part, for example for rotary positioning during the machining of large workpieces or during the moving of loads, comprising two ring-shaped connecting elements (3, 4) each having at least one planar connecting surface (5, 6) and fastening means (7, 8) that are arranged distributed in a crown shape therein and effect connection to different system parts or machine parts or the like, said two connecting elements (3, 4) being arranged concentrically with each other and radially one inside the other with a gap-shaped interspace (9) in which are disposed one or more rows of rolling elements (14, 15, 16), each row whereof rolls between a respective two raceways (17, 18) on the two connecting elements (3, 4), thus enabling same to rotate relative to each other, at least one connecting surface (5, 6) and at least one raceway (17, 18) being formed by machining or shaping a common base body, characterized in that arranged inside the gap (9), on one connecting element (3, 4), is at least one fully circumferentially extending row of magnets (40) and, directly opposite thereto, on the other connecting element (4, 3), at least one fully circumferentially extending row of coils (38).

2. The drive mechanism (1) as in claim 1, characterized in that the gap (9) opens onto two different end sides of the drive mechanism (1).

3. The drive mechanism (1) as in claim 1, characterized in that the connecting surfaces (5, 6) of the two connecting elements (3, 4) are located on end sides of the drive mechanism (1) that face away from each other.

4. The drive mechanism (1) as in claim 1, characterized in that two connecting elements (3, 4) are braced directly against each other in the axial direction via at least one rolling element row (14) disposed between them, the respective raceway (17, 18) on each of the two connecting elements (3, 4) being formed, together with the respective planar connecting surface (5, 6), from a respective common base body.

5. The drive mechanism (1) as in claim 1, characterized in that provided on at least one connecting element (3, 4) is a ring-shaped collar (31) suitable for being clamped, preferably in an axial direction, between two brake shoes.

6. The drive mechanism (1) as in claim 1, characterized in that a plurality of magnets (40) are connected to one another, for example by a common support body (53), to form a common segment body.

7. The drive mechanism (1) as in claim 1, characterized in that the magnets (40) are arranged such that their respective magnetic north and south poles alternate with each other in the circumferential direction of the gap (9).

8. The drive mechanism (1) as in claim 1, characterized in that the magnets (40) are arranged in a plurality of approximately axially parallel rows, in such fashion that the magnetic north and south poles within a row are all oriented parallel to one another.

9. The drive mechanism (1) as in claim 8, characterized in that the rows of magnets (40) having the same magnetic orientation do not extend exactly parallel to the axis of rotation of the drive mechanism (1), but rather at a slight angle thereto, if appropriate in two different circumferential directions in different sections.

10. The drive mechanism (1) as in claim 1, characterized in that the coils (38) are fastened to core bodies (42) which in turn are fastened, preferably tightly screwed, to a circumferential surface (37) in the region of the gap (9).

11. The drive mechanism (1) as in claim 10, characterized in that the gap section (10) receiving the rolling elements (13, 15, 16) is offset in the axial direction, i.e. in the direction of the axis of rotation (2), from the gap section (11) receiving the magnets (40) and coils (38).

12. The drive mechanism (1) as in claim 10, characterized in that the gap section (10) receiving the rolling elements (14, 15, 16) is separated by a fully circumferential seal (24) from the gap section (11) receiving the magnets (40) and coils (38).

13. The drive mechanism (1) as in claim 1, characterized in that a plurality of coils (38) are united to form a common segment, particularly by being mounted on a common segment body (42).

14. The drive mechanism (1) as in claim 1, characterized in that the interconnection of adjacent coils (38) or coil segments (43) takes place on the back side (47) of that section (34) of the particular connecting element (3, 4) which carries the coils (38) or in the region of a mouth of the gap (9).

15. The drive mechanism (1) as in claim 14, characterized in that the contacting of the coils (38) takes place via bores in that section (34) of the particular connecting element (3, 4) which carries them or in the region of a mouth of the gap (9).

16. The drive mechanism (1) as in claim 1, characterized in that a plurality of coils (38) are connected in series.

17. The drive mechanism (1) as in claim 1, characterized in that three strings (ft S, T) of coils (38) are provided, corresponding to a three-phase system.

18. The drive mechanism (1) as in claim 17, characterized in that in each string (ft S, T), ten coils (38) or more are connected in series, for example respectively twenty coils (38) or more, preferably thirty coils (38) or more, particularly forty coils (38) or more.

19. The drive mechanism (1) as in claim 17, characterized in that the strings (ft S, T) are connected at one end (48) in a star or a delta configuration.

20. The drive mechanism (1) as in claim 17, characterized in that the strings (ft S, T) are supplied on the input side by a current converter, particularly by a three-phase current converter or a three-phase current inverter.

21. The drive mechanism (1) as in claim 1, characterized by a rotation angle sensor, for example in the form of an incremental encoder.

22. A ship, vehicle or heavy-duty vehicle and/or construction machine, for example a heavy-duty crane or mobile crane or bucket-wheel excavator or port/ship crane or tunneling machine or (special) lifting machine, comprising at least one drive mechanism (1) as set forth in claim 1, wherein such drive mechanism (1) can set in motion or drive in rotation at least one set of wheels and/or chains, particularly replacing a mechanical steering gear(s).

23. The ship, vehicle or heavy-duty vehicle and/or construction machine as in claim 22, wherein such a drive mechanism (1) can set in motion or drive in rotation at least one preferably horizontally or vertically rotatable or pivotable assembly (A), said assembly (A) being embodied, for example, as an antenna tower or as a gun carriage or as an excavator arm or as a lifting arm or as a boom lift/platform lift or as an operator's cab or as a telescopic boom or as a rotating ladder platform, ideally even as the boring head of a tunneling machine.

24. The ship, vehicle or heavy-duty vehicle and/or construction machine as in claim 23, characterized in that at least one pivotable assembly (A) allows itself to be placed directly, for example in abutment or in a flange-like manner, against at least one connecting element (3, 4) and is fastenable to the drive mechanism by fastening means (7, 8), preferably screw connections, arranged distributed in a crown shape, wherein the axis of rotation (2) of the particular drive mechanism (1) and the center axis or axis of rotation of the assembly (A) overlap or, ideally, are aligned on a common axis.

\* \* \* \* \*